United States Patent [19]

McDowell et al.

[11] Patent Number: 5,214,483
[45] Date of Patent: May 25, 1993

[54] DIGITAL LASER RANGE FINDER EMULATOR

[75] Inventors: Vaughn P. McDowell; Orgal T. Holland, both of Fredericksburg; Christina G. Wilkerson, King George, all of Va.

[73] Assignee: The United States of America as represented by the Secretary of the Navy, Washington, D.C.

[21] Appl. No.: 925,217

[22] Filed: Aug. 6, 1992

[51] Int. Cl.$^5$ .............................................. G01C 3/08
[52] U.S. Cl. .......................................... 356/5; 434/4
[58] Field of Search ........................... 356/5; 434/2, 4; 342/165, 167, 169, 172

[56] References Cited

U.S. PATENT DOCUMENTS

| | | | |
|---|---|---|---|
| 3,601,488 | 8/1971 | Ripart | 356/5 |
| 4,342,514 | 8/1982 | Mathews | 434/2 |
| 4,464,115 | 8/1984 | Simpson et al. | 434/27 |
| 4,552,455 | 11/1985 | Johansson et al. | 356/5 |
| 4,627,723 | 12/1986 | French et al. | 356/5 |
| 4,666,407 | 5/1987 | Jones | 434/2 |
| 4,982,196 | 1/1991 | Thomas et al. | 342/172 |

*Primary Examiner*—Mark Hellner
*Attorney, Agent, or Firm*—John D. Lewis; Jacob Shuster

[57] ABSTRACT

A digital laser range finder emulator receives N-bits of range-to-target data in a parallel format and generates N-bits of serial data representative of the range-to-target data and an external synchronization pulse whose presence is indicative of valid serial data. First and second clock pulses are generated such that the second clock pulse is delayed with respect to the first clock pulse. Control logic, responsive to the first clock pulse, generates validity logic while control logic, responsive to the second clock pulse, generates transmit logic. The parallel format range-to-target data is converted into the serial data in response to the first clock pulse. The serial data is then output in response to the transmit logic. A gate, responsive to the second clock pulse and the validity logic, generates the synchronization pulse when the second clock pulse and validity logic occupy a common logic state.

6 Claims, 2 Drawing Sheets

DIGITAL LASER RANGE FINDER EMULATOR

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to digital signal simulation, and more particularly to a digital laser range finder emulator for emulating a laser range finder's output in a field test environment.

BACKGROUND OF THE INVENTION

The digital laser range finder, because of its versatility and accuracy, is widely used today for computing ranges to targets, landmarks and various objects. Unfortunately, the dangerous nature of lasers limits the use thereof to only those personnel that have been well trained in their operation. Further, availability and cost may restrict the use of laser range finders in many operations. Such safety concerns, laser availability, and cost of the laser range finder often make it difficult to develop systems that require the integration of the digital laser range finder and its output.

While it would appear that a proper solution to this problem would be to simulate the serial data output signal of a laser range finder, the implementation of this solution has proved rather difficult. For example, use of a programmable pulse generator or personal computer to generate serial signals indicative of a laser range finder is suitable for lab conditions. However, at some point it becomes necessary to field test an entire system of which the laser range finder is an integral part. For such field tests, the typical "lab" type devices are too cumbersome, present power supply problems, and are not designed to withstand field test environments in which an entire integrated system needs to be tested. Furthermore, these devices cost thousands of dollars and are typically "over qualified" for the task at hand.

SUMMARY OF THE INVENTION

Accordingly, it is an object of the present invention to provide a digital laser range finder emulator that is of simple construction for its particular purpose.

Another object of the present invention is to provide a digital laser range finder emulator that is suitable for field test environments and eliminates safety, availability and cost concerns associated with a laser range finder when testing a system having the laser range finder as an integral part thereof.

Other objects and advantages of the present invention will become more obvious hereinafter in the specification and drawings.

In accordance with the present invention, a digital laser range finder emulator is provided. The emulator receives N-bits of range-to-target data in a parallel format and generates N-bits of serial data representative of the range-to-target data and an external synchronization pulse whose presence is indicative of valid serial data. First and second clock pulses are generated such that the second clock pulse is delayed with respect to the first clock pulse. Control logic, responsive to the first clock pulse, generates validity logic. Control logic, responsive to the second clock pulse, generates transmit logic. The parallel format range-to-target data is converted into the serial data in response to the first clock pulse. The serial data is then output in response to the transmit logic. A gate, responsive to the second clock pulse and the validity logic, generates the synchronization pulse when the second clock pulse and validity logic occupy a common logic state.

DETAILED DESCRIPTION OF THE INVENTION

Figure 1:
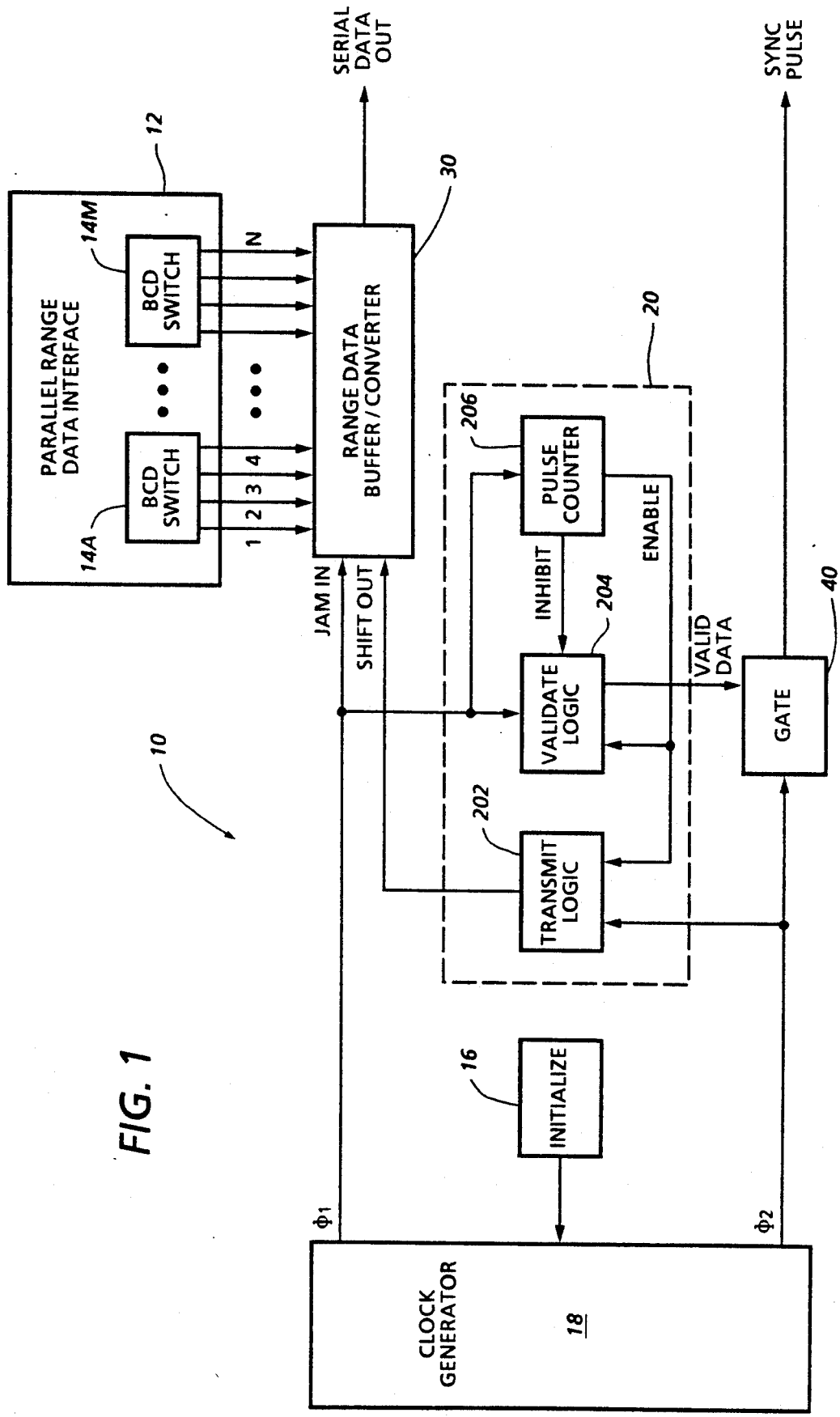
FIG. 1 is a block diagram of the digital laser range finder emulator according to the present invention.

Referring now to the drawings, and more particularly to FIG. 1, a block diagram of the digital laser range finder emulator according to the present invention is shown and is referenced generally by the numeral 10. In operation, range data to be emulated is supplied by a parallel range data interface 12. Interface 12 may be any interface device which allows a user to enter the desired range manually or by remote means. For purposes of description, interface 12 may consist of binary coded decimal (BCD) thumbwheel or pushbutton switches 14A, ..., 14M. Each 4-bit switch is used for a digit of the range to be emulated and outputs the 4-bits for emulation. Accordingly, for each range digit, 4-bits of BCD data is output from interface 12 in a parallel format. In general, depending on the number of digits in the range data, N-bits of parallel data are output from interface 12.

Once the user has selected the range, the emulation process begins in response to a signal from initializer 16. Essentially, initializer starts a clock generator 18 which produces two identical frequency clock pulses $\phi_1$ and $\phi_2$ such that $\phi_2$ is delayed with respect to $\phi_1$. The time delay between first and second clock pulses $\phi_1$ and $\phi_2$ is chosen based on the electronic components receiving the clock pulses. As is standard practice in the field of serial transmission, incoming data must be allowed to settle in the receiving electronics prior to the transmission of a clock pulse that indicates to the receiving electronics that data has arrived. In the present invention, the receiving electronics associated with the first clock pulse $\phi_1$ are the emulator's control logic module 20 and range data buffer/converter 30. The receiving electronics associated with the second clock pulse $\phi_2$ are the emulator's control logic module 20 and gate 40.

The first clock pulse $_1$ serves as a JAM input to converter 30 in order to buffer the parallel format range data supplied by interface 12. First clock pulse $\phi_1$ also initializes a validate logic module 204 and pulse counter 206 which function together (as will be explained in greater detail hereinbelow) to generate a VALID DATA output signal for gate 40. Since laser range finders are typically synchronized systems, it is necessary to provide a synchronization (or SYNC PULSE) in order to serve as an indicator of valid data being output therefrom. Accordingly, gate 40 outputs the SYNC PULSE when it receives both the VALID DATA from control logic 20 and the second clock pulse $\phi_2$. Basing the SYNC PULSE on the (delayed) second clock pulse $\phi_2$ insures that all start-up transients have settled out.

As mentioned above, the first clock pulse $\phi_1$ is used to load converter 30 with the parallel format range data. Further, since the SYNC PULSE must be present as an indication of valid data, the second clock pulse $\phi_2$ is used by transmit logic module 202 to generate a SHIFT OUT input to converter 30. Converter 30 utilizes the SHIFT OUT to send the buffered data from interface 12 as a serial sequence of individual bits (SERIAL DATA OUT) indicative of that produced by a laser range finder. Basing the SHIFT OUT on the (delayed) second clock pulse $\phi_2$ insures that all start-up transients have settled out so that data is not output from converter 30 prematurely.

The overall purpose of validate logic 204 and pulse counter 206 (in conjunction with gate 40) is to terminate the SYNC PULSE after the SERIAL DATA OUT has been transmitted from converter 30. This prevents an intended receiver (not shown) from clocking in false data. Since converter 30 and pulse counter 206 are clocked by first clock pulse $\phi_1$, pulse counter 206 is able to indirectly determine that the transmission of SERIAL DATA OUT is complete by counting N pulses (i.e., the fixed number of bits in the data). The ENABLE pulse from pulse counter 206 is issued when the pulse count is less than N. Transmit logic 202 latches the ENABLE pulse until emulator 10 is reset. After N pulses, an INHIBIT signal is passed to validate logic 204 which provides a continuous signal to gate 40 to terminate the SYNC PULSE.

Figure 2:
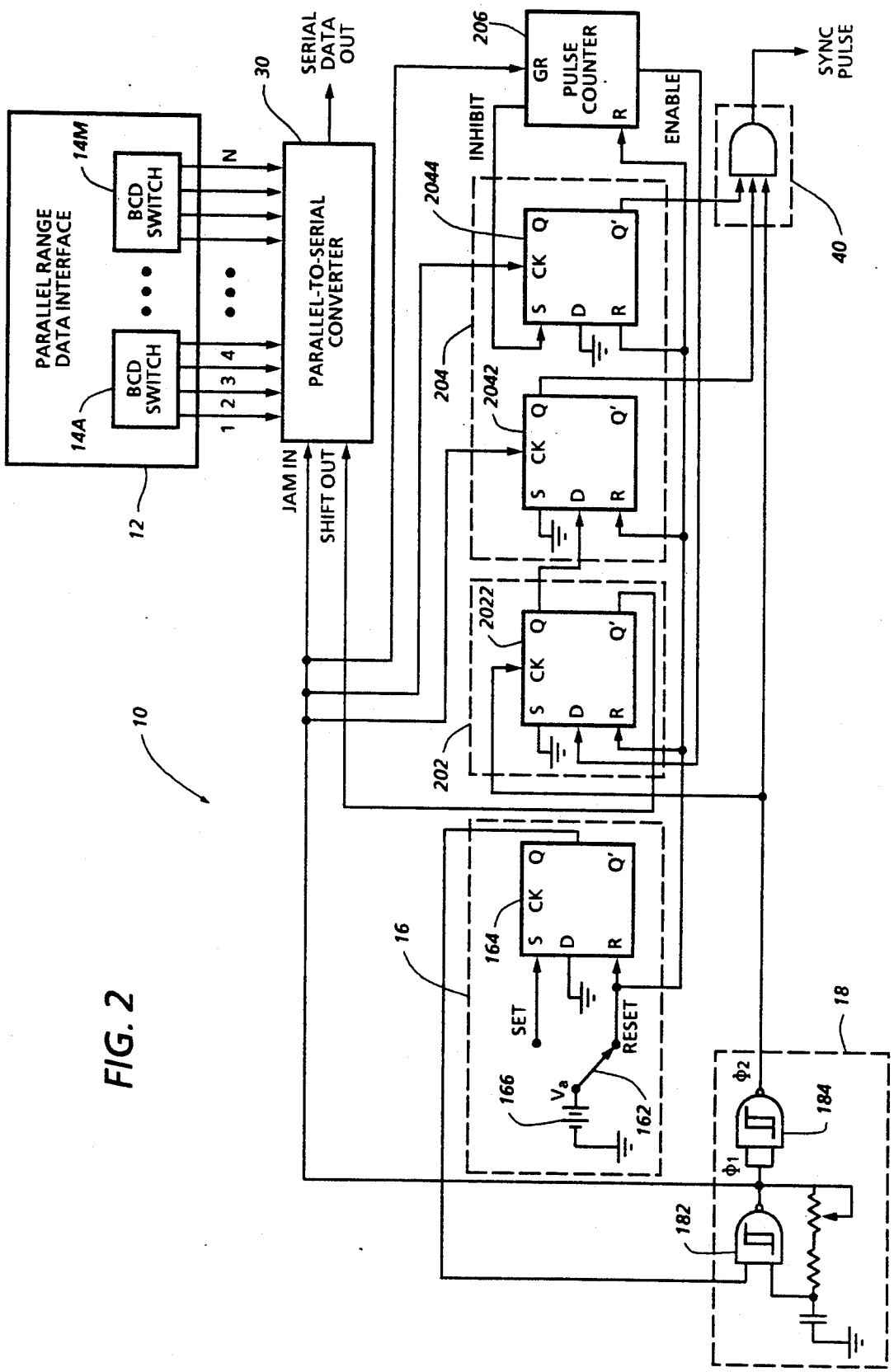
FIG. 2 is a detailed circuit schematic of a preferred embodiment implementation of the digital laser range finder emulator.

A preferred embodiment circuit implementation of emulator 10 will now be described with reference to FIG. 2 where like reference numerals are used for common elements. Note that reference numerals common to the functional blocks of FIG. 1 are used to reference the circuit element(s) performing that function. In particular, initializer 16 includes a switch 162 biased to connect a power supply voltage $V_{cc}$ to the reset input R of a set/reset (SR) flip-flop 164, an SR flip-flop 2022 (serving as transmit logic 202), SR flip-flops 2042 and 2044 (serving as validate logic 204), and pulse counter 206. The voltage $V_{cc}$ is supplied by an on-board battery 166.

When switch 162 is in the RESET position, the output Q of each flip-flop 164, 2022 and 2042 assumes a logic level low while the output Q' of flip-flop 2044 assumes a logic level high. With respect to flip-flop 164, a logic level low at its output Q disables clock generator 18. However, when it is desired to initialize the emulator's operation (i.e., after selecting a range to be emulated by setting BCD switches 14A, ..., 14M), switch 162 is shifted to the SET position where it is connected to the set input S of flip-flop 164 causing its Q output to be a logic level high. This enables a first Schmitt trigger 182 to generate the first clock pulse $\phi_1$. The first clock pulse $\phi_1$ enables a second Schmitt trigger 184 to generate the second clock pulse $\phi_2$.

Flip-flop 2022 controls the operating mode of parallel-to-serial converter 30 (i.e., JAM IN data or transmit data serially). When switch 162 is in the RESET position, the output Q of flip-flop 2022 is at a logic level low causing converter 30 to be in the JAM IN data mode. Specifically, when emulator 10 is first turned on, converter 30 must first store data from BCD switches 14A, ..., 14M before the data can be transmitted serially. After switch 162 is switched to the SET position, oscillator 18 is turned on and the first clock pulse $\phi_1$ is transmitted to converter 30 to JAM IN the data from BCD switches 14A, ..., 14M. Specifically, the first pulse of first clock pulse $\phi_1$ is used to strobe parallel data. Once first clock pulse $\phi_1$ has strobed the parallel data, converter 30 is ready to transmit this data serially.

Pulse counter 206 counts the pulses of first clock pulse $\phi_1$ and sends a signal via the ENABLE line to the latch input D of flip-flop 2022. This signal is a logic level high allowing flip-flop 2022 to receive the second clock pulse $\phi_2$ from Schmitt trigger 184. The output Q of flip-flops 2022 and 2042 reflects the logic state of the latch input D of flip-flop 2022 after the second clock pulse $\phi_2$ is received. Hence, when second clock pulse $\phi_2$ is received, if latch input D is high then the output Q (of flip-flops 2022 and 2042) is high; if latch input D is low then the output Q is low.

After first clock pulse $\phi_1$ has oscillated through its first low-to-high transition or edge, latch input D of flip-flop 2022 is high. When second clock pulse $\phi_2$ provides a positive transition pulse to flip-flop 2022, the Q' output (SHIFT OUT) of flip-flop 2022 goes low causing converter 30 to assume the serial shift mode. The Q output of flip-flop 2022 is supplied to the latch input D of flip-flop 2042 which indicates that valid data is about to be transmitted. From this point on, first clock pulse $\phi_1$ is used for clocking out serial data from converter 30 because the output Q' of flip-flop 2022 is a logic level low and remains low until emulator 10 is reset.

Pulse counter 206 begins counting the number of output pulses upon receipt of the first clock signal $\phi_1$. If the number of output pulses is equal to or less than a predetermined number necessary to clock out the N-bits from converter 30, pulse counter 206 issues an ENABLE to the latch input D of flip-flop 2022. However, once the number of output pulses is greater then the predetermined number necessary to clock out the N-bits from converter 30, pulse counter 206 issues the INHIBIT signal to the set input S of flip-flop 2044 causing the output Q' thereof to go low. This disables gate 40 to prevent any further transmission of the SYNC PULSE.

In response to the SHIFT OUT, converter 30 outputs the range data in a serial format. As noted above, the SYNC PULSE must be present before range data is accepted as valid data. Accordingly, gate 40 is a logical AND gate receiving the second clock pulse $\phi_2$, the Q output from flip-flop 2042 and the Q' output from flip-flop 2044. When the Q output of flip-flop 2022 goes high, the latch input D of flip-flop 2042 is set high. Upon the next transition of first clock pulse $\phi_1$, the Q output of flip-flop 2042 goes high and is supplied to gate 40. As configured, the Q' output of flip-flop 2044 is a logical level low only when the INHIBIT is issued by pulse counter 206. In this way, AND gate 40 will only output the SYNC PULSE during the time that the N-bits are being shifted out of converter 30.

It is to be understood that the present invention is not limited to particular circuit components. However, by way of example, the circuit of FIG. 2 may be implemented with the following components manufactured by RCA, Inc., One Micron Drive, Research Triangle Park, N.C. 27709: Clock generator 18 may be configured using the CD4093B integrated circuit (IC); Flip-flops 164, 2022, 2042 and 2044 may be configured using the CD4013B IC; Converter 30 may be configured using the CD4014B or CD4021B ICs; and Pulse counter 206 may be configured using the CD4024A IC.

The advantages of the present invention are numerous. The laser range finder emulator of the present invention is a cost efficient device for introducing emulated range finder data to other instruments or systems. The device outputs clock signals and range data in the serial format of a digital laser range finder thereby providing the ability to test an overall system without encountering the dangers/safety precautions associated with laser range finders. By utilizing simple digital logic components and an on-board battery, the design of the present invention is simple to construct, transport and use.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A digital laser range finder emulator that receives N-bits of range-to-target data in a parallel format to generate N-bits of serial data representative of the range-to-target data and an external synchronization pulse whose presence is indicative of valid serial data, comprising:
   means for generating first and second clock pulses, wherein said second clock pulse is delayed with respect to said first clock pulse;
   control logic means responsive to said first clock pulse to generate validity logic, and responsive to said second clock pulse to generate transmit logic;
   means for converting the parallel format range-to-target data into the serial data in response to said first clock pulse, and for outputting the serial data therefrom in response to said transmit logic; and
   gating means responsive to said second clock pulse and said validity logic to generate the synchronization pulse when said second clock pulse and said validity logic occupy a common logic state.

2. A digital laser range finder emulator as in claim 1 wherein said means for generating said first and second clock pulses comprises:
   a set/reset (SR) flip-flop circuit having set and reset input terminals, wherein an active high state is selectively applied to one of said set and reset input terminals, and wherein said SR flip-flop circuit outputs an initialization signal in response to said set input terminal receiving the active high state;
   a first Schmitt trigger circuit for generating said first clock pulse in response to the initialization signal; and
   a second Schmitt trigger circuit for generating said second clock pulse in response to said first clock pulse.

3. A digital laser range finder emulator as in claim 1 wherein said control logic means comprises:
   means, responsive to said first clock pulse, for generating an enable signal for each of the N-bits of parallel format data being converted to serial data, and for generating a disable signal after the N-bits of parallel format data have been converted to serial data;
   a first set/reset (SR) flip-flop circuit for generating said transmit logic in response to said second clock pulse and the enable signal;
   a second SR flip-flop circuit for generating a first portion of said validity logic at a logic level high in response to said first clock pulse; and
   a third SR flip-flop circuit for generating a second portion of said validity logic at a logic level high in response to said first clock pulse, and for generating the second portion of said validity logic at a logic level low in response to the disable signal.

4. A laser range finder emulator as in claim 3 wherein said means for generating the enable signal and the disable signal comprises a pulse counter for counting each of the N-bits being converted to serial data.

5. A laser range finder emulator as in claim 1 wherein said means for converting is a parallel-to-serial converter, and wherein said first clock pulse serves as a JAM input to said parallel-to-serial converter and said transmit logic serves as a SHIFT OUT input to said parallel-to serial converter.

6. A laser range finder emulator as in claim 3 wherein said gating means is a logical AND gate receiving said second clock pulse, and the first and second portions of said validity logic.

* * * * *